Patented Apr. 21, 1953

2,636,103

UNITED STATES PATENT OFFICE 2,636,103

WELDING ELECTRODE

José Vazquez-Arias, Bogota, Colombia

No Drawing. Application December 17, 1951,
Serial No. 262,169

8 Claims. (Cl. 219—8)

This invention relates to welding electrodes, a composition of material for coating electrodes, and methods for applying said coating.

Heretofore, in the welding art, different types of electrodes were required to be used for the welding of various kinds of materials. In accordance with the present invention, I have discovered a welding rod composition that can be used for welding the various kinds of steel, iron, and cast iron. It is readily seen, therefore, that my invention represents a tremendous saving and economy as it eliminates the necessity of maintaining stocks of many types of electrodes.

In addition to the versatility of my electrode as regards use in welding the various types of metals, it possesses outstanding advantages for welding cast iron. Among these advantages is that a relatively low temperature can be employed, and yet deep penetration into the cast iron being welded is effected. A weld seam, substantially free of scale, is obtained and which seam possesses high strength. The freedom of scale eliminates the necessity for brushing or cleaning as is usually required with other types of weld. One other advantage is that the weld produced using my electrode, as well as the metal welded, can be machined to produce a smooth surface, whereas prior art welds can be machined only with great difficulty. The outstanding advantages of my electrode produced in accordance with my invention are as follows:

1. Only one type of electrode for welding of all steels, malleable iron and cast iron.
2. A very thin coating of the flux, permitting easier and more economic jobs.
3. High degree of penetration, eliminating the necessity of making a V and loss of material.
4. Perfect fusion with the base metals, leaving the welded area accessible to filing and machining.
5. Elimination of scale as the ingredients do not produce it, nor form bubbles.
6. Superior to all others for ornamental work. This electrode in the 7/64" size substitutes the 1/8" size of other competitive products, meaning a lower initial cost.
7. The consumer gets more metal per pound as the coating of flux is thinner than all others.
8. Its high resistance to traction permits its use on repairs of malleable and cast iron machinery parts, the results being unequalled by others.

The method for the production of my electrode is illustrated by the following specific statements, it being understood that the examples are being given by way of illustration and the conditions can be varied within certain reasonable limits.

The core material used in my electrode comprises a basic low carbon steel as illustrated by bright SAE nail wire. The proper size nail wire, which for example may range from about $\frac{3}{32}$"–$\frac{3}{8}$" in diameter, is copper plated. The copper plating may be applied by immersing the electrode in a solution of 10% copper sulfate and 10% sulfuric acid for a period of about one second. The electrode is then removed, washed with cold water, and allowed to dry. This copper plating can be applied by electrolysis if so desired. The copper plated electrode is now ready for applying a flux coating. The flux composition which I employ is prepared as follows:

| | Parts by weight |
|---|---|
| Sodium silicate | 25 |
| White dextrine | 25 |
| Zinc oxide | 3 |
| Sodium carbonate | 4 |
| Cobalt oxide | 1.5 |
| Calcium phosphate | 20 |
| Manganese oxide | 1.5 |
| Dippel oil | 0.5 |
| Borax | 3 |
| Water | 16.5 |

The above ingredients are mixed and put through a ball mill such as is used for the manufacture of enamels, the mixture being milled for a period of time sufficient to produce a very compact and fine paste. The copper plated electrode is immersed vertically in the welding flux composition to permit the paste to adhere thereto. Normally a coating of sufficient thickness is obtained by inserting the electrodes slowly and withdrawing them slowly, allowing the excess paste to drip off. The coated electrodes are then allowed to dry while still in the vertical position. Sufficient drying is usually accomplished by permitting the coated electrodes to stand at room temperature overnight, or about twelve hours.

If the coating is too heavy, the flux mixture can be thinned slightly with water, and should the mixture be too thin, the coating on the electrodes can be increased by a second immersion.

The flux coating on my electrode is much thinner than flux coatings normally employed on weld rods. For example, the flux coat on my electrode is usually not greater than 20–40% as thick as the coats employed on commercially available weld rods.

After the coated electrodes have become dry, they are placed in a hermetically-sealed container in which gaseous carbon dioxide has been placed. The electrodes are then allowed to remain in this carbon dioxide atmosphere for a period of about three hours. The exposure of my coated rod to an atmosphere of carbon dioxide is an essential step to the production of my final welding rod product. While I have found exposure of the coated rod to the carbon dioxide atmosphere for a period of three hours produces a desirable composition, it is contemplated that exposure for a shorter period of time or for longer periods of time may be employed depending somewhat upon the thickness of the coating on the rod. The carbon dioxide treatment hardens and/or fixes the coating on the rod, and I feel otherwise affects the welding properties of the rod. In the above electrode coating composition, the components cooperate in the following manner to result in the finished product. While it is believed the action attributed to the various components are those listed below, I do not desire to limit myself to the exact functions stated, since in the final analysis it is the end result which is important, and which I know is produced with my welding rod composiiton. On the other hand, it is desired to describe the individual contributions made by each of the components in order that substances producing equivalent effects may be included within the scope of my invention:

The sodium silicate serves as a bonding agent, and in addition has some fusion power. Sodium silicate is readily available, and from an economic standpoint is the preferred silicate. However, if desired, other silicates may be employed;

The dextrine serves as a bonding agent, and is preferred, but other equivalent bonding agents may be utilized.

The zinc oxide contributes to the opacity of the coating and aids in giving the paste the proper consistency. It can be omitted without adversely affecting the welding property of the electrode;

The sodium carbonate contributes fluxing power and is an important factor for transforming the carbon in austenite and martinsite;

The cobalt oxide is a coloring agent and vehicle to inhibit the preoxidation of the rod coating. It also produces better ductility of the weld;

The calcium phosphate liquefies the metal and transforms the austenite and martinsite contained in the iron;

The combination of the Dippel oil with the calcium phosphate eliminates the crystallization of the graphite and the carbon, imparting ductility. Neats-foot oil is preferred but can be replaced with other low-viscosity animal oils;

Borax imparts fluxing power and cleaning of the metal during welding;

Water is necessary to form the above ingredients into a paste.

The above components result in a welding rod composition which has excellent fusing and penetration powers and readily transforms the austenite and martinsite, the important components of iron and steel.

Usually in welding operations through the crystallization of the carbon in the iron, there are formed laminated coatings which impart great hardness to iron and steel. My electrode has the enormous advantage that through the copper plating of the rod and the coating of the combination of the materials mentioned, these laminated coatings are transformed into annular coatings, making the bead of the weld much more ductile and very resistant to breakage, and at the same time resulting in a welded product that can be easily filed and machined.

In utilizing my welding rod for the welding of cast iron, no preheating of the iron is required, nor is it required to canal, "V" or otherwise prepare the material to be welded. The electrode is simply applied directly to the part desired to weld, and used with either direct or alternating current, the electrode being connected to the negative pole, polarity Reversible "E," using the following amperage:

| Diameter of the Rod, inches | Limit Amperage |
| --- | --- |
| 5/64 | 25-55 |
| 3/32 | 25-65 |
| 7/64 | 30-70 |
| 1/8 | 50-100 |
| 5/32 | 60-150 |
| 3/16 | 100-190 |
| 7/32 | 120-220 |
| 1/4 | 150-280 |
| 9/16 | 200-500 |
| 3/8 | 260-620 |

The electrode can be applied in all positions and in any direction, and it leaves a bead free of cinder and scales. In addition the metal, even cast iron, remains malleable and machinable. In actual practise my electrodes have been used for welding:

Cast iron with: cast iron, malleable iron and steel;

Malleable iron with: cast iron steel, malleable iron;

Steels with: steels, cast iron, malleable iron.

What I claim is:

1. A weld rod comprising a low carbon steel core having a cooper plating thereon and a flux coating enclosing said core, said coating containing a binding agent, an alkali silicate, an alkali carbonate, cobalt oxide, calcium phosphate, manganese oxide, an alkali borate and a low-viscosity animal oil, which coating has been subjected to an atmosphere of gaseous carbon dioxide.

2. A welding electrode comprising a copper plated basic low carbon steel core having a coating thereon including a binding agent, an alkali metal silicate, an alkali metal carbonate, cobalt oxide, calcium phosphate, manganese oxide, an alkali metal borate and a low-viscosity animal oil, said coating having been treated with gaseous carbon dioxide.

3. A welding electrode comprising a copper plated basic low carbon steel core having a coating thereon including dextrine, sodium silicate, sodium carbonate, cobalt oxide, calcium phosphate, manganese oxide, sodium borate and Dippel oil, said coating having been treated with gaseous carbon dioxide.

4. A welding electrode comprising a copper plated basic low carbon steel core having a coating thereon derived from a paste containing about 25 parts sodium silicate, about 25 parts white dextrine, about 3 parts zinc oxide, about 4 parts sodium carbonate, about 1.5 parts cobalt oxide, about 20 parts calcium phosphate, about 1.5 parts manganese oxide, about 0.5 part Dippel oil, about 3 parts borax and about 16.5 parts water, said coating being subjected after drying to an atmosphere of gaseous carbon dioxide.

5. A method for producing a weld rod which comprises applying to a copper plated basic low carbon steel core a thin coat of a paste comprising a binding agent, an alkali metal silicate, an alkali metal carbonate, cobalt oxide, calcium phosphate, manganese oxide, an alkali metal borate, a low-viscosity animal oil and water, drying said coat and subjecting the dry coated weld rod to an atmosphere of gaseous carbon dioxide.

6. A method for producing a welding electrode which comprises the steps of copper plating a basic low carbon steel core, applying a thin coat of a paste composition including a binding agent, an alkali metal silicate, an alkali metal carbonate, cobalt oxide, calcium phosphate, manganese oxide, an alkali metal borate, a low-viscosity animal oil, and water, drying the thin coat and subjecting said coated electrode to treatment with gaseous carbon dioxide.

7. A method for producing a welding electrode which comprises applying to a copper plated basic low carbon steel core a thin coat of a paste composition including a binding agent, an alkali metal silicate, an alkali metal carbonate, cobalt oxide, calcium phosphate, manganese oxide, an alkali metal borate, a low-viscosity animal oil and water, drying the thin coat and subjecting said coated electrode to treatment with gaseous carbon dioxide in a sealed container.

8. A method for producing a welding electrode which comprises applying to a copper plated basic low carbon steel core a thin coat of a paste composition including dextrine, sodium silicate, sodium carbonate, cobalt oxide, calcium phosphate, manganese oxide, sodium borate, Dippel oil and water, drying the thin coat and subjecting said coated electrode to a treatment with gaseous carbon dioxide in a sealed container for a period of about three hours.

JOSÉ VAZQUEZ-ARIAS.

No references cited